Jan. 9, 1951 M. HANDSCHIN ET AL 2,537,407
METHOD OF AND ARRANGEMENT FOR THE CODED REMOTE SETTING IN OPERATION OF AN AUTOMATIC TELEPHONOGRAPH OVER A TELEPHONE CIRCUIT
Filed July 29, 1947
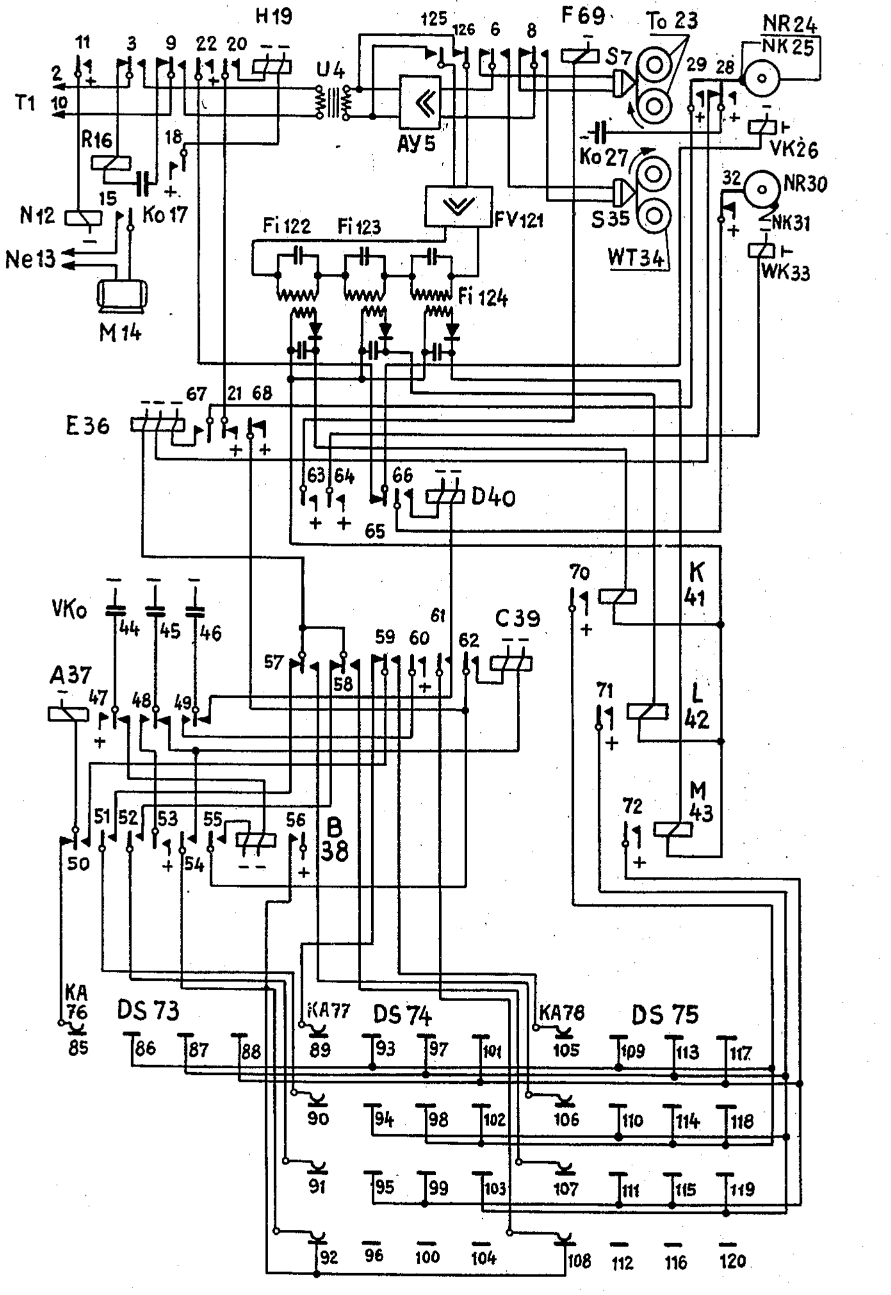
INVENTORS
MAX HANDSCHIN and
KURT WAGNER
BY
Richards & Geier
ATTORNEYS Patented Jan. 9, 1951

2,537,407

UNITED STATES PATENT OFFICE 2,537,407

METHOD OF AND ARRANGEMENT FOR THE CODED REMOTE SETTING IN OPERATION OF AN AUTOMATIC TELEPHONOGRAPH OVER A TELEPHONE CIRCUIT

Max Handschin, Kusnacht-Zurich, and Kurt Wagner, Zurich, Switzerland, assignors to Daphne Investment Trust, Vaduz, Principality of Liechtenstein, a company of the Principality of Liechtenstein Application July 29, 1947, Serial No. 764,520
In Switzerland March 7, 1947

9 Claims. (Cl. 179—6)

The present invention relates to a particularly simple and reliable method for the coded remote setting in operation of an automatic telephonograph over a telephone circuit and an arrangement for carrying out the method.

The remote control of electric devices by an electric circuit is very simple when the available circuit is employed exclusively for the remote control. The oldest method of remote control consists in this case of the connection and disconnection of a control current (telegraph). The problem of remote control is considerably more complicated when it is to take place over a public telephone line in coded form, for example, in accordance with certain directions, the transmission of a secret code or the like, so that only an authorized person is able to operate the remote-controlled device in this manner. This problem arises in the operation from a distance of the reproducing arrangement of the known automatic telephonographs.

The method of the invention is characterised in that the telephone circuit is charged by the subscriber with vocal sounds which are fed to filters which pass certain components of these vocal sounds and the components thus filtered out are made to act on the coding arrangement, which consists of adjustable change-over switches and relays and is connected to the telephonograph. The remote setting in operation of the telephonograph takes place only after the subscriber has spoken a few vocal sounds in predetermined succession so that these sound in the prescribed succession may pass the filter of the coding arrangement which, if desired, may be adjusted for the passage of different vocal sounds and of different succession.

The arrangement for carrying out the method is characterised in that filters (Fi122—124) adapted to pass components of human vocal sounds are connected to the input circuit of the coding arrangement and the coding arrangement includes change-over switches (DS 73—75) and relays (A37, B38, C39), whereby the number and order of succession of the vocal sounds necessary for setting the telephonograph in operation is determined by the adjustment of the change-over switches.

The automatic connection of the filter amplifier to the telephone channel is most simply effected by relays actuated by the telephone calling current.

The filter amplifier is preferably arranged as a simple single-channel amplifier with an efficient final output stage, to which filters passing the various frequencies are connected. A particularly simple form and arrangement of the filters is such that each individual filter is constructed as a parallel resonance circuit tuned to a predetermined frequency, and all these circuits are fed in series from the final stage of the filter amplifier. The alternating-current voltages set up at the filters are preferably rectified, for the purpose of actuating relays, with rectifier elements, either directly or, for the purpose of adaptation, after transformation and fed to the connected relay windings.

The charging of the filter amplifier with the necessary frequencies which can be passed by the filters can take place in various ways. It is possible to tune the filters to the sound frequencies of pipes or other acoustic sound producers, which are set in operation in the prescribed order of succession by the calling subscriber. A particularly simple and practical method according to the invention consists therein that the voice of the subscriber is used to speak separate protracted sounds, in particular pure vocal sounds, into the telephone receiver, these sound comprising in particular harmonies or components, the frequencies of which are substantially independent of the height of the fundamental tone.

It is thus possible, by speaking a vocal sound to cause a filter to respond, which is tuned to one or more components of this sound.

A form of embodiment of the invention is illustrated by way of example in the accompanying drawing.

In this drawing, T1 is the incoming subscriber's telephone line, U4 a transmitter (transformer). To23 the two spools supporting a magnetic sound tape (sound carrier) on which the text of the message is recorded, and WT34 the spools of the sound tape for recording the conversation, S7 and S35 magnetic reproducing sound heads and M14 the motor fed by the supply line Ne13 and driving the sound tape spools. Connected to the sound tape spools with considerable reduction are the cam discs NR24 and NR30 with the cams NK25 and NK31 respectively and the associated contacts. The sound tape spools are coupled by the magnetic couplings VK26 and WK33 to the motor M14, AV5 designates a valve amplifier for the amplification of the voltages emanating from the sound heads S7 and S35, and FV121 designates the filter amplifier, to which the filters Fi122, Fi123 and Fi124 are connected. The references N12, R16, H19, F69, E36, D40, K41, L42, M43, A37, B38 and C39 apply to relays of known form, the numbered contacts actuated by the individual relays each being shown on the extension of the axis of the relay cores. Individual condensers bear the designations Ko17, Ko27, VKo44, VKo45 and VKo46. Finally, DS73, DS74 and DS75 are three change-over switches (selector switches) each individually adjustable to four positions. The first change-over switch has only one sliding contact KA76 and four fixed contacts 85, 86, 87 and 88, while the other two change-over switches each have four sliding contacts actuated with one another in each case, namely KA77, KA79, KA81 and KA83 on the one hand and KA78, KA80, KA82 and KA84 on the other hand. Each of these sliding contacts brushes over four fixed contacts upon actuation of the switch. It will be seen from the circuit diagram of these change-over switches, which constitute together with the relays A37, B38 and C39 the actual coding arrangement of the remote control, that the vertically spaced fixed contacts 93—95, 97—99, 101—103, 109—111, 113—115, and 117—119 are connectable, with the relays K41, L42 and M43 are to create a great number of modifications, these relays in turn being connected and supplied with current by the filters Fi122—Fi124. It is, of course, possible to substitute plugs and other known change-over means for the disclosed change-over switches with sliding contacts. Moreover, the number of change-over switches need not coincide with the number of filters as in the present example, but for example a plurality of filters may be allocated to a smaller number of change-over switches and vice versa.

The operation of the circuit arrangement will be explained with reference to four functional examples. In this explanation, the negative pole of the battery (or public supply equipment) supplying the entire circuit arrangement is referred to as "negative" and the grounded positive pole thereof as "earth."

If the subscriber T1 calls the telephonograph over the exchange line 2, 10 (telephone circuit), the relay R16 is energised by the calling current, from the circuit:

(1) T1, wire 2, contact 3, relay R16, condenser Ko17, contact 9, wire 10, subscriber T1.

The energized R16 closes its contact 18 and energizes the relay H19 from the circuit:

(2) Earth, contact 18, relay H19, negative.

The relay H19 closes or changes over its contacts 3, 9, 11, 22, 20. The mains relay N12 is thus energised and in turn switches on the motor M14. The following circuit is formed:

(3) Earth, contact 11, relay N12, negative.

The motor is energised from the circuit:

(4) Mains Ne13, contact 15, motor M14, mains Ne13.

The relay H19 is held, from the circuit:

(5) Earth, contact 21, contact 20, holding winding, relay H19, negative.

By the changing over of the contacts 3 and 9, the subscriber T1 is connected to the transformer U4. In our example, the sound carriers To23 and WT34 and the cam discs NR24 and NR30, which are coupled with the sound carriers with considerable reduction, are set in motion in the direction of the arrow by the energized electromechanical couplings VK26 and WK33 which latter are driven by the motor M14.

By the energisation of the relay H19, the forward coupling VK26 is energised from the circuit:

(6) Earth, contact 22, contact 65, forward coupling VK26, negative.

In this way, the sound carrier To23, which answers the subscriber T1 in the known manner, is set in motion in the direction of the arrow. The subscriber T1 hears in the known manner the text of the instruction message recorded on the sound carrier To23, from the circuit:

(7) Subscriber T1, wire 2, contact 3, transformer U4, output amplifier AV5, contact 6, reproducing head S7 and back to the contact 8, AV5, U4, contact 9, wire 10, subscriber T1.

The cam disc NR24, which is considerably geared down, also runs in the direction of the arrow. The contacts 28 and 29 are changed over or closed.

The subscriber is now able, while the reproduction of the text of the instruction message on the sound carrier To23 is audible to him, to obtain the reproduction of the message on the other sound carrier WT34 by pronouncing a few vocal sounds in proper sequence, but only when the code, namely the few vocal sounds coincide with the change-over switch DS73, DS74, DS75, that is to say, when the order of succession of the vocal sounds coincides with the order of succession set on the change-over switches the message recorded on the sound carrier WT34 will be released. The means for the remote actuation of the sound carrier WT34 consist of the filter amplifier FV121 and a plurality (3 in the example) of filters Fi122, 123 and 124 tuned to characteristic components (harmonics) to be filtered out from the individual vocal sounds spoken by the subscriber.

It is known that in vocal sounds of the human voice the timbre and consequently the characteristic harmonics of the vocal sound always lie approximately at the same point of the frequency spectrum independently of the height of the fundamental tone and independently of the person speaking. The invention utilises this phenomenon in that the harmonics only occurring in one vocal sound in each case are each filtered out by a separate filter. If, for example, the subscriber pronounces an A, the filter Fi122 is thereby energised and the secondary winding coupled with it feeds a half-wave rectifier. The direct current produced by the said rectifier actuates in a known manner a highly sensitive relay K41. Similarly, for example, in the case of the vowel O, the relay L42 is energised and in the case of the vowel U the relay M43 is energised.

The circuit arrangement will now be explained with reference to a number of examples of correct and incorrect actuation, a selecting arrangement, for example, three rotary switches DS73, 74 and 75, being provided, which can be rotated into different positions.

*First example*

In this example, a correct remote actuation will be described: Before the proprietor of the telephonograph departs from his home or office, he adjusts the code system to be responsive to, for example, the vowels A (rotary switch DS73 to position 86), O (rotary switch DS74 to positions 97, 98, 99, 100) and U (rotary switch DS75 to positions 117, 118, 119, 120). The subscriber who calls now the proprietor during his absence must now pronounce these vowels in this order, that is, A, O, U in order to have a message reproduced to him which the proprietor may have left for him. When the subscriber T1 pronounces the vowel A, the following circuit is formed:

(8) Subscriber T1, wire 2, contact 3, U4, contact 126, filter amplifier FV121, filter Fi122 and back to FV121, contact 125, U4, contact 9, wire 10, subscriber T1.

By the energisation of the filter Fi122 a direct current is produced by a half-wave rectifier through the secondary winding coupled with the said filter, and this direct current energises the relay K41 in the known manner. The vowel A pronounced is then tested through the rotary switch DS73 and the relay A37 is energised, from the circuit:

(9) Earth, contact 70, position 86 (DS73), contact arm KA76, contact 50, relay A37, negative.

By the energisation of the relay A37, the condenser VKo is energised from the circuit:

(10) Earth, contact 47, condenser VKo44, negative.

When the subscriber ceases to pronounce the vowel A, the circuit 8 and with it the circuit 9, becomes de-energised and the relay A37 falls back into the inoperative position. The condenser VKo44 charged in the circuit 10 can now discharge and energise the relay B38, from the circuit:

(11) Condenser discharge VKo44, contact 47, relay B38, negative.

The relay B38 is held by the circuit:

(12) Earth, contact 68, contact 55, relay B38, negative.

By the energisation of the relay B38, the rotary switch DS74 is connected to the relay A37. If the subscriber now pronounces the vowel O, the circuit 8 is again energised, but the filter Fi122 does not respond, but according to our example the filter Fi123 will pass the frequencies produced by the vowel O and consequently the relay L42 will be energised. If the relay L42 is now energised, the relay A37 is again energised by the closing of the contact 71, from the circuit:

(13) Earth, contact 71, position 97, contact arms KA77, contact 59, contact 50, relay A37, negative.

While the relay A37 is energised, the condenser VKo45 is charged from the circuit:

(14) Earth, contact 53, contact 48, condenser VKo45, negative.

When the subscriber ceases to pronounce the vowel O, the circuit 8, and with it the circuit 13, becomes de-energised and the relay A37 falls back into the inoperative position. The condenser VKo45 charged in the circuit 14 can now discharge and energise the relay C39 from the circuit:

(15) Condenser discharge VKo45, contact 48, relay 48, relay C39, negative.

The relay C39 is held by the circuit:

(16) Earth, contact 68, contact 62, relay C39, negative.

By the energisation of the relay C39, the rotary switch DS75 is connected to the relay A37. When the subscriber pronounces the vowel U, the circuit 8 is again energised, but the filter Fi122 and the filter Fi123 do not respond, but the filter Fi124 and consequently the relay M43. By the pulling up of the relay M43, the relay A37 is again energised owing to the closing of the contact 72, from the circuit:

(17) Earth, contact 72, position 117, contact arm KA78, contact 59, contact 50, relay A37, negative.

While the relay A37 is energised, the condenser VKo46 is charged from the circuit:

(18) Earth, contact 60, contact 49, condenser VKo46, negative.

When the subscriber ceases to pronounce the vowel U, the circuit 8, and with it the circuit 17, becomes de-energised and the relay A37 falls back into the inoperative position. The condenser VKo charged in the circuit 18 can now discharge and energise the relay D40, from the circuit:

(19) Condenser discharge VKo46, contact 49, relay D40, negative.

The relay D40 is held by the circuit:

(20) Earth, contact 32, contact 66, relay D40, negative.

By the opening of the contact 65 of the relay D40, the circuit 6 is now broken, that is to say, the sound carrier To23 remains stationary with the cam disc NR24. It will be assumed for purposes of our example of embodiment that the sound carrier WT34 and the cam disc NR30 considerably geared down therewith are already in the reproducing position. By the energisation of the relay D40, the relay F69 is energised from the circuit:

(21) Earth, contact 63, relay F69, negative.

By the energisation of the relay F69, the amplifier AV5 is switched over from the sound carrier To23 to the sound carrier WT34. The filter amplifier FV121 is disconnected by the opening of the contacts 125 and 126. The electromagnetic coupling WK33 is also energised from the circuit:

(22) Earth, contact 64, coupling 33, negative.

The sound carrier WT34 is set in motion in the direction of the arrow, as also the cam disc NR30 running with considerable reduction. When the cam NK31 opens the contact 32, that is to say, when the reproduction is ended, the circuit 20 is broken, and the circuits 21 and 22 are thus also broken. The circuit 6 is again closed until the cam NK25 changes over or separates the contacts 28 and 29. Before the changing over of the contact 28, the condenser Ko has been charged from the circuit:

(23) Earth, contact 28, condenser Ko27, negative.

When the contact 28 has been changed over, the condenser Ko can discharge to the relay E36, from the circuit:

(24) Condenser discharge Ko27, contact 28, relay E36, negative.

The relay E36 breaks on the one hand the circuits 12 and 16 and on the other hand the circuit 5. The circuits 3 and 4 are thus also de-energised.

*Second example*

In the second example, the case will be described where only two vowels are pronounced, the rotary switch DS73 lying in position 86, the rotary switch DS74 in position 97, 98, 99 and 100 and the rotary switch DS75 in position 105, 106, 107 and 108. The caller must then pronounce the vowels A and O if he desires to hear the reproduction of the telephonograph.

The circuits described in the first example are again set up and energised in the same order of succession. Since, however, the subscriber T1 has only pronounced two vowels, only the relay B38 and the relay C49 are thus also energised. However, in order that the caller may obtain the reproduction, the relay D40 is not energised by the discharge of a condenser (circuit 18), but from the circuit:

(25) Earth, contact 56, (relay B38) rotary switch DS75, position 108, contact arm KA84, contact 61, relay D40, negative.

In this way, the subscriber will obtain the reproduction as in the first example.

*Third example*

The proprietor of the telephonograph can naturally also pronounce the code in an order other than A, O, U, so that greater variations are possible. It will be assumed, for example, that the rotary switch DS73 has been turned to position 88, the rotary switch 74 to position 93, 94, 95, 96 and the rotary switch DS75 to position 109, 110, 111 and 112, which corresponds to the secret code U. A. A. Thus, when the subscriber T1 pronounces the vowels the filter Fil24 and Fil22 are energised, the latter twice, and the relays M43 and K41 are also energised, the latter also twice. Consequently, the relay M43 is first energised and energises the relay A37 with its contact 72, from the circuit:

(26) Earth, contact 72, position 88, contact arm KA76, contact 50, relay A37, negative.

The circuit 10 is then energised and, when the relay A37 has fallen off, the circuit 11 is energised, while the relay B38 is held by the circuit 12. During the pronouncing of the first vowel A, the relay K41 is energised through the filter Fil22 and the relay A37 is energised from the circuit:

(27) Earth, contact 70, position 93, contact arm *Ka*77, contact 59, contact 50, relay A37, negative.

The circuit 14 is energised and, when the relay A37 has fallen off, the circuit 15 is energised and the relay C39 is held by the circuit 16. If the subscriber T1 again pronounces the vowel A, the filter Fil22 is again energised, and with it the relay K41. The relay A37 is actuated by the circuit:

(28) Earth, contact 70, position 109, contact arm KA78, contact 59, contact 50, relay A37, negative.

The circuit 18 is closed and, after the relay A37 has fallen off, the circuit 19 is energised. Furthermore, the relay D40 is held by the circuit 20. The subscriber hears the reproduction as in the first example.

*Fourth example.—Incorrect actuation*

Should the calling subscriber T1 not pronounce the vowels A, O, U, for example, in the order in which the switches DS73, 74 and 85 are set, he will not succeed in obtaining the reproduction. If, for example, the rotary switch DS73 is turned to position 86 (corresponding to the vowel A), the rotary switch DS74 to position 97, 98, 99 and 100 (corresponding to the vowel O) and the rotary switch DS75 to position 117, 118, 119 and 120 (corresponding to the vowel U) and the subscriber pronounces the first vowel correctly, the circuits 8, 9, 10, 11 and 12 are set up. But if he pronounces, for example, the vowel U instead of the vowel O, the relay A37 and with it the circuits 14, 15 and 16 will not be energised, but the relay E36 will be energised and will immobilise the reproduction.

The relay E36 will be energised by the circuit:

(29) Earth, contact 72, position 99, contact arm KA81, contact 52, contact 58, relay E36, negative.

The relay E36 will be held by the circuit:

(30) Earth, contact 29, contact 67, relay E36, negative.

The circuit 12 will be broken by the energisation of the relay E36. In this case, the sound carrier To23 and the forward coupling VK26 (circuit 6) will not be interrupted and the sound carrier will continue to run until the cam NK25 has changed over or separated the contacts 28 and 29. The circuit 5 and 30 will thus again open. By the falling off of the relay H19, all the remaining circuits will also be broken.

If the subscriber T1 pronounced the second vowel, in our example an O, and after the O, for example, an A instead of a U, the locking relay E36 would thus also be energised. At the pronunciation of the first vowel A, the relay K41 and the circuits 9, 10, 11 and 12 would be closed. Upon the pronunciation of the second vowel, in our example O, the relay L42, the circuits 13, 14, 15 and 16 would be energised, and by the pronunciation of the third but incorrect vowel A, not the relay A37 but the relay E36 would be energised by the circuit.

(31) Earth, contact 70, position 118, contact arm KA80, contact 57, relay E36, negative.

The relay E36 would be held by the circuit 30. The circuits 12 and 16 would thus become de-energised and the disconnection would take place as described.

If the subscriber T1 did not in the first actuation pronounce a vowel corresponding to the setting of the rotary switch DS73, the circuits 9–20 would not be energised at all, but the sound carrier To23 and with it the cam NR24 would continue to rotate until they reached the initial position, whereby the circuits 23 and 24 would be formed. The circuit 5 and all the remaining circuits would thus be de-energised.

We claim:

1. In a system for remote control of a telephonograph, a telephone circuit, means to cause a recorded message which is in readiness in said telephonograph to be reproduced and transmitted to a remote subscriber in response to a number of predetermined vocal sounds spoken by the subscriber in a predetermined sequence and transmitted over said telephone circuit to said remote station, said means comprising an amplifier, means for automatically connecting said amplifier to said telephone circuit and actuated by the telephone calling current, a coding system, and filters one for each said vocal sounds and means for passing components of their respective vocal sounds into said coding system, said coding system including a plurality of serially arranged change-over switches and a plurality of relays which latter are energized in succession as each of said vocal sounds has successively passed through its respective filter in the predetermined sequence, and means actuated by said coding system for effecting the reproduction of the recorded message.

2. A system according to claim 1, in which the filters are connected in the amplifier output circuit.

3. A system according to claim 1, in which the filters are arranged as resonance circuits having parallel connected inductance and capacitance.

4. A system according to claim 1, including a filter for each sound and means for connecting these filters in series.

5. A system according to claim 1, including a rectifier, one for each filter, and a relay connected to each rectifier.

6. A system according to claim 1, in which the coding arrangement includes change-over switches having selector arms with a plurality of contacts, the arrangement being such that when the change-over switches are in the selecting positions the selected filter is connected to one contact arm and all the remaining non-selected filters are each connected to a locking contact arm.

7. A system according to claim 1, including a relay, and means for energizing said relay by relay contacts and through a locking contact arm (Ka79—82), if the order of succession of the vocal sounds transmitted by the subscriber does not coincide with the predetermined order of succession for which the coding system is adjusted whereby the subscriber's telephone circuit is disconnected.

8. A system according to claim 1, including a plurality of relays, and means for energising said relays by contact-making in the coding system when the order of succession of the vocal sounds transmitted by the subscriber coincides with the sounds to which the coding arrangement is adjusted, whereby the filters, the amplifier and the coding system are separated from the telephone circuit and the recorded message is reproduced and delivered into the telephone circuit of the subscriber.

9. In a system for remote operation of a telephonograph, a telephone circuit, an amplifier connected to said telephone circuit in advance of said telephonograph, means operated by the calling current for connecting said telephone circuit with said amplifier, a coding device, means for connecting said coding device to said amplifier, means whereby said coding device is responsive to a predetermined number of sounds of voice frequency when transmitted in predetermined sequence by said telephone circuit and said amplifier and including a plurality of serially arranged filter circuits each of which being constructed to pass a certain frequency, said coding device including also a plurality of adjustable change-over switches and a plurality of successively operable relays arranged in advance and between said switches for testing and controlling the successive current impulses passing through said filter circuits, and means controlled and operated by said coding device for connecting said telephonograph with said telephone circuit.

MAX HANDSCHIN.
KURT WAGNER.

REFERENCES CITED

The following references are of record in the file of this patent:

UNITED STATES PATENTS

| Number | Name | Date |
|---|---|---|
| 1,726,947 | Chauveau | Sept. 3, 1929 |
| 1,765,471 | Wensley | June 24, 1930 |
| 1,949,136 | Adair | Feb. 27, 1934 |
| 1,951,454 | Jiefenbacher | Mar. 20, 1934 |
| 1,973,081 | Keiser | Sept. 11, 1934 |
| 2,171,366 | Hipple | Aug. 29, 1939 |
| 2,195,081 | Dudley | Mar. 26, 1940 |
| 2,238,555 | Dudley | Apr. 15, 1941 |
| 2,261,420 | Shively et al. | Nov. 4, 1941 |